United States Patent [19]

Armstrong

[11] Patent Number: 4,683,737
[45] Date of Patent: Aug. 4, 1987

[54] ANTI-THEFT DEVICE

[76] Inventor: Ennels D. Armstrong, 505 Kirts, Troy, Mich. 48084

[21] Appl. No.: 667,085

[22] Filed: Nov. 1, 1984

[51] Int. Cl.⁴ ............................................. E05B 65/12
[52] U.S. Cl. ...................................... 70/253; 70/252; 70/256
[58] Field of Search ................. 70/225, 237, 252, 253, 70/255, 256, 422, 257

[56] References Cited

U.S. PATENT DOCUMENTS

| | | | |
|---|---|---|---|
| 1,159,041 | 11/1915 | Jones et al. | 70/253 |
| 1,180,801 | 4/1916 | Terry | 70/253 |
| 1,199,559 | 9/1916 | Jones | 70/253 |
| 1,233,825 | 4/1917 | Pabst | 70/253 |
| 1,527,405 | 2/1925 | Halversa | 70/253 |
| 1,923,907 | 8/1933 | Blaschk | 70/253 |
| 2,219,645 | 10/1940 | Bartho | 70/253 |
| 3,442,102 | 5/1969 | Butts | 70/422 |
| 4,488,417 | 12/1984 | Werner | 70/253 |

FOREIGN PATENT DOCUMENTS

338593  6/1921  Fed. Rep. of Germany ........ 70/253

Primary Examiner—Robert L. Wolfe
Attorney, Agent, or Firm—Harness, Dickey & Pierce

[57] ABSTRACT

Two embodiments of anti-theft devices for motor vehicles, each of which includes a locking device that is engageable with the steering mechanism for preventing steering of the vehicle. A remotely positioned operator is connected to the locking device by a breakaway connection that prevents operation of the locking device if the connection is tampered with. In one embodiment, the device is operated electrically and in the other embodiment, it is operated mechanically.

8 Claims, 13 Drawing Figures

ANTI-THEFT DEVICE

BACKGROUND OF THE INVENTION

This invention relates to an anti-theft device and more particularly to an improved anti-theft device for motor vehicles.

Automobile theft is one of the major problems in the country. The number of motor vehicles stolen each year has reached alarming proportions. This is so even though all present motor vehicles are provided with a coincidental steering column lock in addition to the ignition system lock. That is, unless the ignition is switched on with the proper key, the steering column is locked so that it will be impossible to steer the vehicle. The theory behind such locks has been to preclude auto thefts by the practice known as "hot wiring" wherein the ignition switch is directly shorted out without using a key. Although the theory is good, in practice, the coincidental lock has not reduced automobile thefts and, in some ways, has actually made thefts easier. In order to reduce the cost and simplify the arrangement, most motor vehicle manufactures now mount the ignition switch on the steering column and employ the coincidental lock at the same location. This means that a thief need only physically remove the ignition lock and he will have not only disabled the ignition lock but will have disabled the steering column lock.

It is, therefore, a principal object of this invention to provide an improved anti-theft device for motor vehicles.

It is a further object of this invention to provide an improved lock for the steering of a motor vehicle which will minimize the likelihood of theft.

The likelihood of theft can be substantially reduced if a steering lock is provided which is operative on the actual steering mechanism of the vehicle rather than the steering column. That is, it is desirable to provide a remotely positioned lock that will positively engage the vehicle steering mechanism so as to prevent the vehicle from being steered. In addition, it is desirable if such a lock is operative to lock the steering when the front wheels are at one of their fully locked positions and the vehicle is parked next to the curb. This sustantially reduces the likelihood of theft by towing of the vehicle. However, where a remotely positioned steering lock is provided, it is essential to provide some mechanism so as to avoid the mechanism being tampered with and operated independently of the control for the lock.

It is, therefore, a further object of this invention to provide an improved breakaway control for an anti-theft device that will make release of the lock impossible if the mechanism is tampered with.

SUMMARY OF THE INVENTION

A first feature of this invention is adapted to be embodied in an anti-theft device for a motor vehicle having a pair of dirigible front wheels, a steering shaft rotatable under operator control and steering means for interconnecting the steering shaft with the front wheels for steering of the front wheels. In accordance with this feature of the invention, selectively operable locking means are cooperable with the steering means for preventing steering of the front wheel by the steering shaft.

Another feature of this invention is adapted to be embodied in an anti-theft device for a motor vehicle having a pair of dirigible front wheels, a steering shaft rotatable under operator control and steering means for interconnecting the steering shaft with the front wheels for steering of the front wheels. In accordance with this feature of the invention, means are provided in proximity to the front wheels for locking them against steering movement and a remotely positioned operator is provided in the operator's compartment of the vehicle for operating the locking device. The connection between the remotely positioned operator and the locking device includes a breakaway connection that prevents release of the locking device if the interconnection is tampered with.

DETAILED DESCRIPTION OF THE PREFERRED EMBODIMENTS

Figure 1:
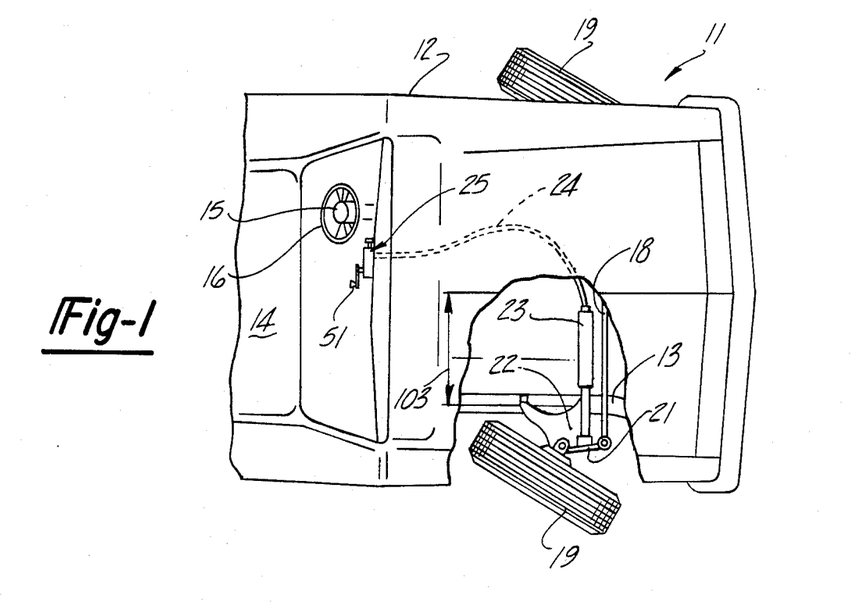
FIG. 1 is a top plan view of the front portion of a motor vehicle having a locking device constructed in accordance with a first embodiment of the invention, with a portion broken away.
Figure 2:
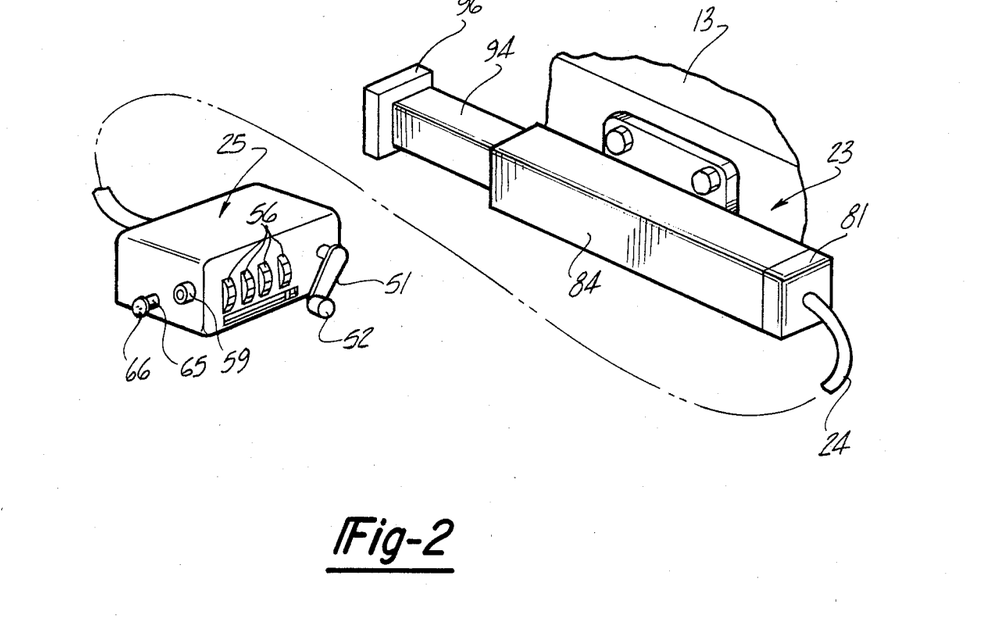
FIG. 2 is a partially schematic perspective view showing the elements of the locking device of this embodiment.

Referring first to FIG. 1, a motor vehicle embodying this invention is identified generally by the reference numeral 11. The motor vehicle 11, only the front portion of which is shown for a reason which will become apparent, is comprised of a body 12 mounted upon a frame assembly 13 and which defines a passenger compartment 14. A steering column 15 is journaled by the frame 13 and carries a steering wheel 16 that is positioned within the passenger compartment 14. The lower end of the steering column 15 is connected to a steering gear box (not shown) that has on its output shaft a Pitman arm (not shown). The Pitman arm is journaled on the frame 13 and is connected to a idler arm 17 by means of a tie rod 18 in a known manner. The vehicle has a pair of front wheels 19, each of which carries a steering arm 21 that is connected to either the Pitman arm or the idler arm 17 by means of a short link 22. The construction thus far described may be considered to be conventional and for that reason the details of it have not been illustrated nor is a description believed to be necessary.

In accordance with the invention, a steering lock device, indicated generally by the reference numeral 23, is carried by the frame 13 adjacent to either the Pitman arm or the idler arm 17 for a reason which will become apparent. The locking device 23 is connected by means of a connecting mechanism 24 to a control device, indicated generally by the reference numeral 25 and which is positioned in the passenger compartment 14 in a suitable location. This location may be either under the dashboard adjacent the steering wheel 16 or may be positioned in a concealed location such as in the glove box.

Referring now primarily to FIGS. 2 through 7, the control device 25 will be described in detail. The control device 25 is comprised of an outer housing assembly, indicated generally by the reference numeral 26, and which may be formed from any suitable material. Preferably, the construction of the outer housing 26 is such that it provides a sealed unit that is relatively impregnable so that it will foil attempts to force it. The housing 26 is formed with a first gear cavity portion 27 and a locking cavity 28. Referring first to the gear cavity portion 27, it includes an input gear 29 that is fixed to a collar 31 which, in turn, is fixed to a shaft 32 that is journaled for rotation in a suitable manner as by means of a pair of spaced plates 33 formed internally in the housing 26. As will become apparent, the input or drive gear 29 is movable in an axial direction between a disengaged position, as shown in the solid line view of FIG. 3, and an engaged position, as shown in the phantom line view. The gear 29 moves through a dimension, indicated by the line 34 between its disengaged and its engaged position.

Figure 3:
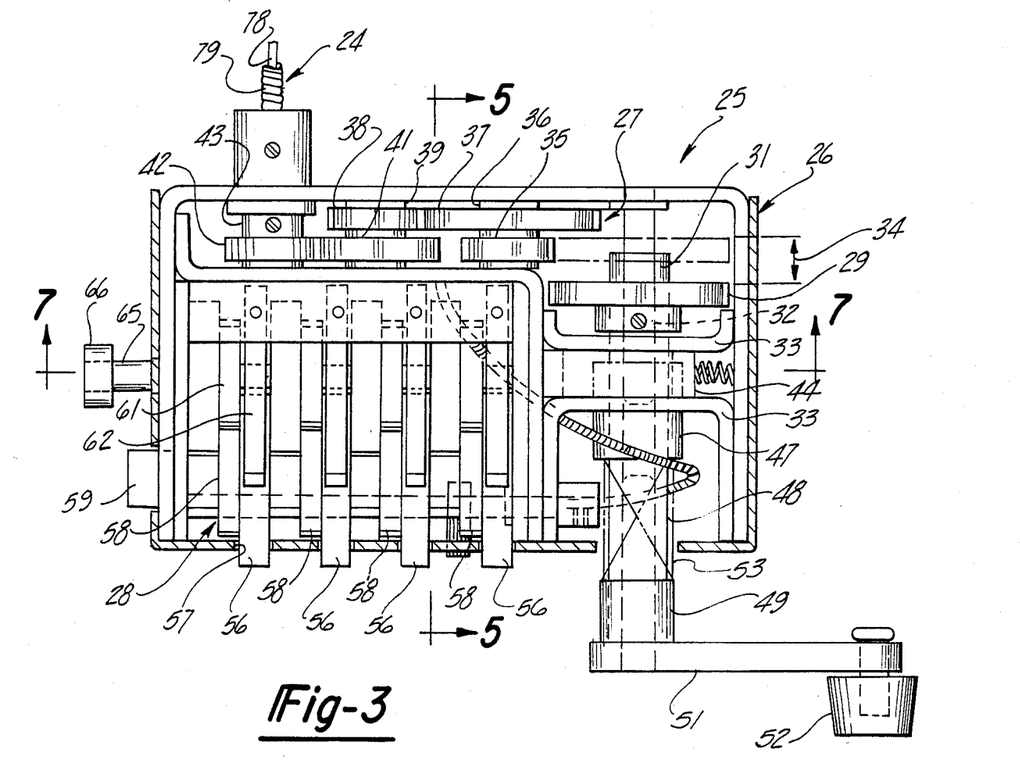
FIG. 3 is a top plan view, with portions shown in section, of the operating device.
Figure 4:
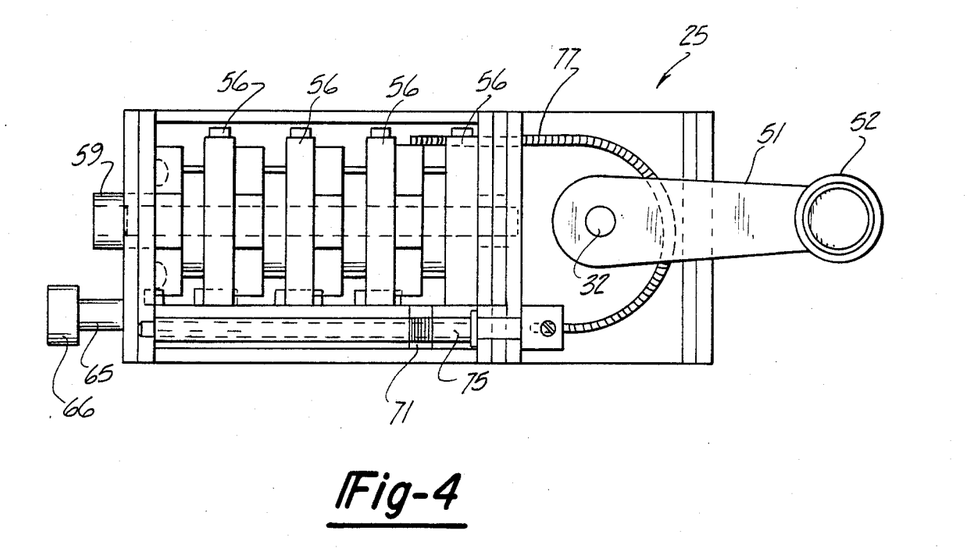
FIG. 4 is a front elevational view, with the coverplate removed, of the operating device.
Figures 5, 6:
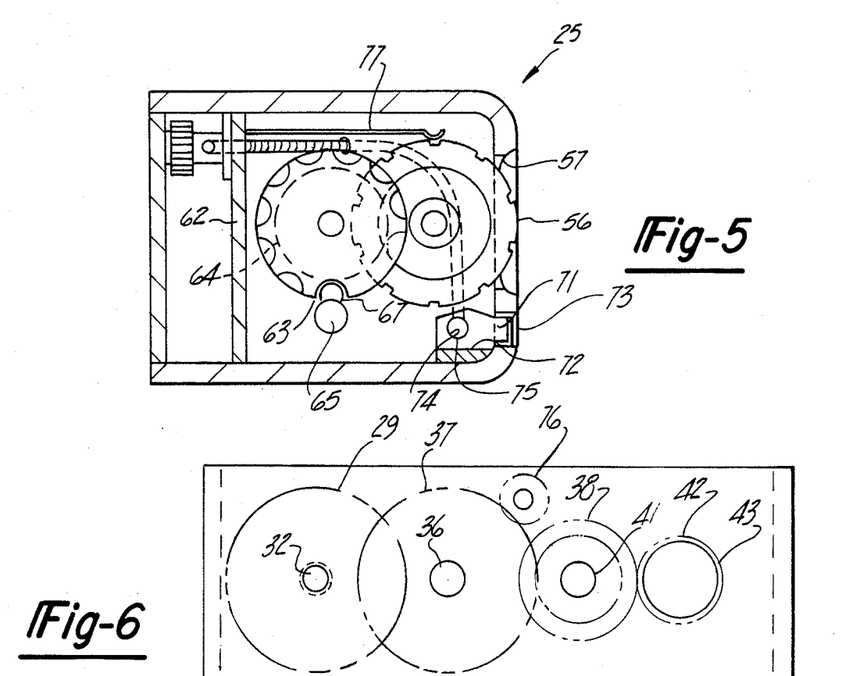
FIG. 5 is a cross-sectional view taken along the line 5—5 of FIG. 3.
FIG. 6 is a rear elevational view of the locking device.
Figure 7:
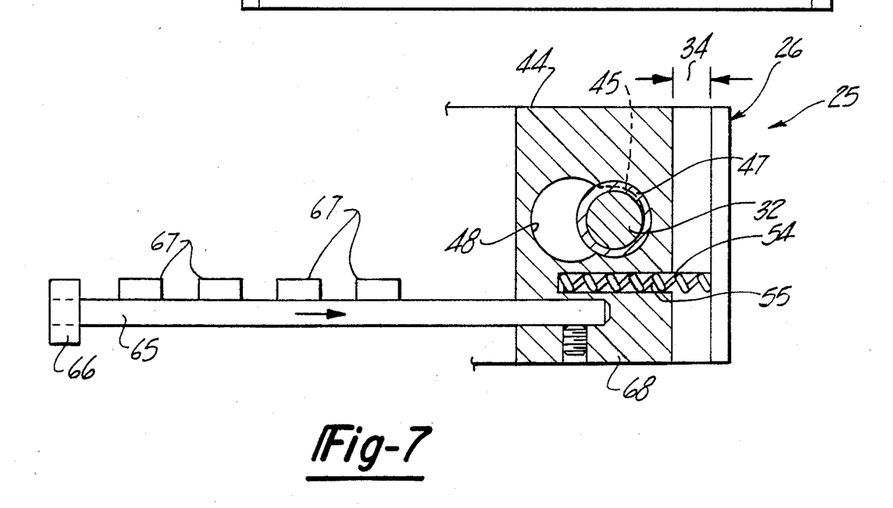
FIG. 7 is a partial cross-sectional view taken along the line 7—7 of FIG. 3.

In the engaged position, the input gear 29 is adapted to mesh with a first gear 35 that is fixed to an idler shaft 36 that is supported within the gear cavity 27. A gear 37 is also fixed to the shaft 36 and meshes with a gear 38 that is fixed to a further shaft 39 carried within the gear cavity 27. A gear 41 is also affixed to the shaft 39 and meshes with an output gear 42 carried on a shaft 43 within the cavity 27. The gear train comprised of the gears 29, 35, 37, 38, 41 and 42 forms a step up gear unit for amplifying the rotation of the input shaft 32 relative to the output shaft 43.

A locking or blocking plate 44 is slidably supported within the locking cavity 28 of the housing 26 and between the plates 33. The locking plate 44 is formed with a keyhole shaped slot (FIG. 7) which has a smaller diameter portion 45 that is sized approximately equal to the diameter of the shaft 32 and a larger portion 46 that is sized sufficiently so as to clear a collar 47 that is affixed to the shaft 32 at its forward side. The collar 47 is integrally connected to a reduced diameter bushing 48 which is, in turn, adjacent a sleeve 49 of a crank handle 51 that is fixed to the outer end of the shaft 32. The crank handle 51 has a knob 52 so as to facilitate its rotation so as to drive the shaft 32 in a rotary manner.

In the position shown in the solid line view in the figures, the handle 51 and shaft 32 are urged to their outward disengaged positions by means of a coil compression spring 53 which encircles the sleeve 49 and which is engaged with a fixed shoulder within the housing 26 so as to urge the shaft 32 outwardly.

The locking plate 44 is urged to its locking position by means of a coil compression spring 54 that is received in a bore 55 of the locking plate 44 and which engages the housing 26 so as to normally urge the locking plate 44 to the locked position as shown in the figures.

In order to release the locking plate 44 so that it can be moved to its disengaged position, a combination lock is provided comprised of a plurality of wheels 56, the number of which may be varied to suit a particular application. These wheels 56 are provided with notched peripheries which are accessible through access openings 57 formed in a cover plate of the housing assembly 26 so that suitable legends on their periphery may be viewed by the operator. The legend may take the form of either numerals or letters or any other suitable device normally used for this purpose.

Each wheel 56 is integrally connected to a gear 58 and the wheels 56 and gears 58 are all journaled on a common shaft 59 that passes through the housing assembly 26. The gears 58 are each meshed with respective gears 61 that are fixed to tumbler wheels 62 that are aligned with the wheels 56 and which are independently supported on a shaft or shafts supported within the housing 26. The tumbler wheels 62 are formed with circumferentially spaced single notches 63 so as to form their locking function. There are also provided recessed openings 64 in one face of the tumbler wheels 62 for a purpose which will become apparent.

An operating rod 65 is slidably supported within the housing 26 and carries an operating knob 66 at its exposed outer end. A plurality of keys 67 are formed on the operating rod 65 at aligned locations and which are shaped so as to pass through the slots 63 of the tumbler wheels 62 when they are appropriately aligned. The inner end of the rod 65 is staked, by a set screw 68, to the locking plate 44 so that when the notches 63 are appropriately aligned, the keys 67 may pass through the notches 63 and the locking plate 44 may be moved so that its larger opening 46 is aligned with the axis of the shaft 32 so that it may be forced inwardly to bring the gear 29 into meshing engagement with the gear 35 so as to rotate the gear train and drive the output shaft 43.

An indicator member 71 is slidably supported within a slot 72 in the face of the housing beneath the openings 57. A clear plastic cover 73 covers the opening 72. The indicator member 71 is formed with a threaded opening 74 through which a threaded rod 75 extends. The threaded rod 75 is rotatably coupled through a flexible transmitter 77 to a driving gear 76 that is in mesh with the gear 37. As a result, rotation of the gear 76 will effect axial movement of the indicating member 71 so as to provide the operator with a visual indication of the condition of the locking device 23.

The output shaft 43, as has been noted, is coupled to the locking device 23 by the connecting device 24 which comprises a flexible connector. For this purpose, a wire 78 of the connecting device 24 is rotatably coupled to the shaft 43 in any suitable manner. A protective sheath 79 encircles the wire 78 and extends to the face of the locking device 23.

Referring now to FIGS. 8 through 12, the wire 78 of the connector device 24 passes through a cover plate 81 of the locking device 23 where it is affixed to a shaft 82 that is journaled in the cover plate 81. The cover plate 81 and an outer housing 84 of the locking device 23 are formed from hardened steel so as to resist attack by a thief.

Figure 8:
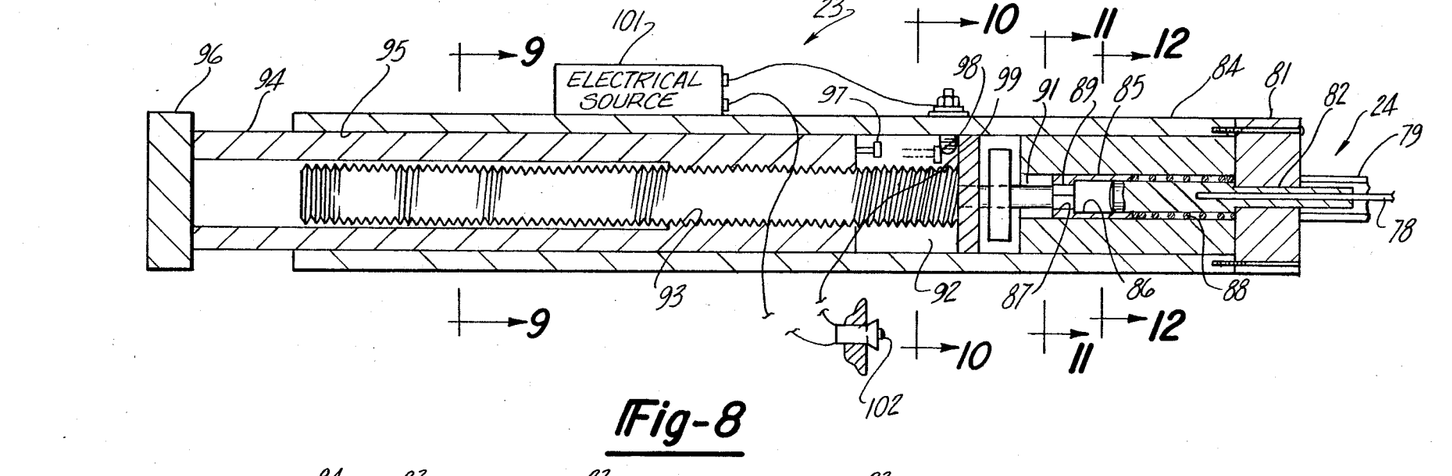
FIG. 8 is an enlarged cross-sectional view showing the steering locking mechanism.
Figure 9:
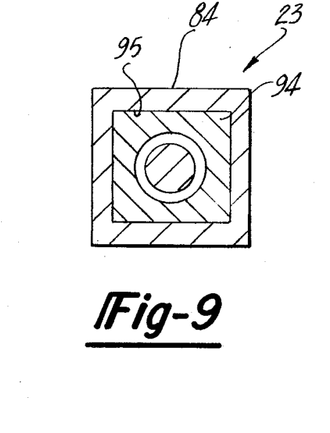
FIG. 9 is a cross-sectional view taken along the line 9—9 of FIG. 8.
Figures 10, 11:
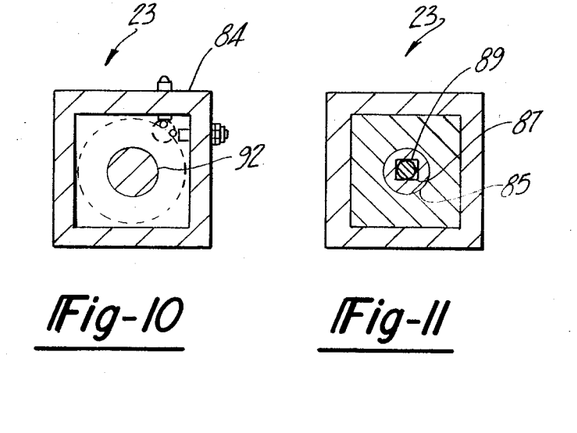
FIG. 10 is a cross-sectional view taken along the line 10—10 of FIG. 8.
FIG. 11 is a cross-sectional view taken along the line 11—11 of FIG. 8.
Figure 12:
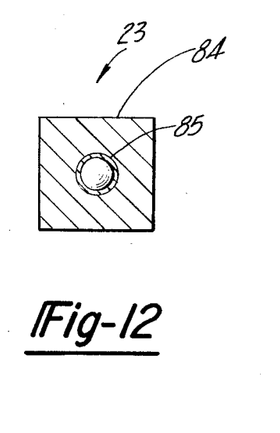
FIG. 12 is a cross-sectional view taken along the line 12—12 of FIG. 8.

The shaft 82 carries a collar 85 at its inner end which is formed with a counterbore 86 and a socket opening 87. A coil compression spring 88 encircles the shaft 82 and engages the collar 85 and cover plate 81 for a reason to be described.

The socket opening 84 receives a complementary headed portion 89 of a shaft 91. The adjacent portion of the shaft 91 is of a smaller diameter than the socket opening 87 so that the coil compression spring 88 may urge the socket opening 87 over the shaft 91 so as to disengage the connection between the headed portion 89 and the opening 87 if the connector device 24 is severed.

The shaft 91 is integrally formed with a male threaded shaft 92 that is received in a female threaded opening 93 of a blocking member comprised of a sleeve 94 that is slidably supported in an opening 95 of the housing 84. A foot member 96 is affixed to the outer end of the blocking sleeve 94 and is adapted to engage either the idler arm 17 or the Pitman arm so as to lock the wheels 19 in one of their fully locked positions, as will become apparent.

A contact 97 is carried on the inner end of the blocking member 94 and is adapted to engage a contact 98 carried by the housing 84 and a contacting portion 99 formed on the threaded portion 92 of the shaft 91 so as to close a circuit between an electrical source 101 and a dashboard mounted light 102. In addition, if desired, the switch consisting of the terminals 98 and 99 and contacting member 97 may also be in circuit with the horn of the car 11 so as to sound the horn when the blocking member 94 is in a released position.

The operation of this embodiment will now be described. If it is desired to lock the unit, the car 11 is parked preferably so that its front end is not accessible and so that the front wheels 19 are steered in a direction so that they will abut an adjacent curb. At this time, the blocking member 94 and foot 96 will be fully retracted. Once the steering gear is turned so that the wheels 19 are at a full lock, the operator dials the appropriate combination on the wheels 56 so as to be able to push the push rod 65 by its knob 66 inwardly so as to move the locking member 44 to its released position. As has been previously noted, the tumbler wheels 62 are provided with recesses 64 which are complementary in shape to the notches 63 but which do not pass completely through the tumbler wheels 62. Thus, a thief trying to test the combination of the device cannot do so merely by pushing the rod 65 inwardly since the key 67 will enter the recesses 64 and foil an attempt to test the combination of the lock through feel.

Assuming that the combination has been properly set, the shaft 52 is forced inwardly to bring the gear 29 into mesh with the gear 35. The handle 51 is then rotated in the appropriate direction so as to rotate the flexible wire 78 and rotate the shaft 82. Assuming that the connecting device 24 has not been attacked and is intact, the socket opening 87 will be engaged with the shaft mating portion 89 and the shaft 91 will rotate. This causes the threaded member 92 to rotate and since it is axially fixed within the housing 84, the blocking member 94 and its foot 96 will extend through the dimension 103 as shown in FIG. 1, until the idler arm 17 or Pitman arm, whichever it is engaged with, is engaged and the wheels will then be held locked. At this time, the member 65 is released so as to bring the locking member 44 back into its locked position once the knob 51 and shaft 32 have been withdrawn so as to disengage the gears 29 and 35. The system is then locked.

It should be readily apparent that it will be impossible for a thief to release the locking mechanism unless he knows the combination. If he tries to release the locking mechanism by severing the connecting device 24, the spring 88 will urge the shaft 82 inwardly and the socket opening 87 will move out of engagement with the shaft portion 89 and it will be impossible for a thief to rotate the shaft 91. As has been noted, the housing 84 and cover plate 81 are formed from a hardened material as is the blocking member 94 and foot 96 so that these elements cannot be sawed off. Furthermore, the mounting to the frame 13 should be done in such a way that this attachment cannot be disengaged. Therefore, the device renders the automobile 11 theftproof.

It should be noted that if the vehicle is parked against a curb, it will not be possible to tow it away unless the front end is lifted. However, if the front end is parked so it is inaccessible and/or if the transmission is locked in gear, the vehicle still cannot be towed away. Thus, a very effective theft prevention system is provided.

When the operator wishes to resume operation of the vehicle 11, he resets the combination and engages the gears 29 and 35 so as to rotate the wire actuator 78 to turn the screw 92 and withdraw the blocking member 94 and its foot 96. When the contact 97 engages the terminals 98 and 99, the circuit will be closed illuminating the light 102 and sounding the horn, if desired. The operator then knows that it is safe to operate the car and he rotates the shaft 32 slightly so as to bring the terminal 97 out of engagement with the contacts 98 and 99. There is, however, sufficient clearance so as to permit free steering movement under this slightly rotated position.

Figure 13:
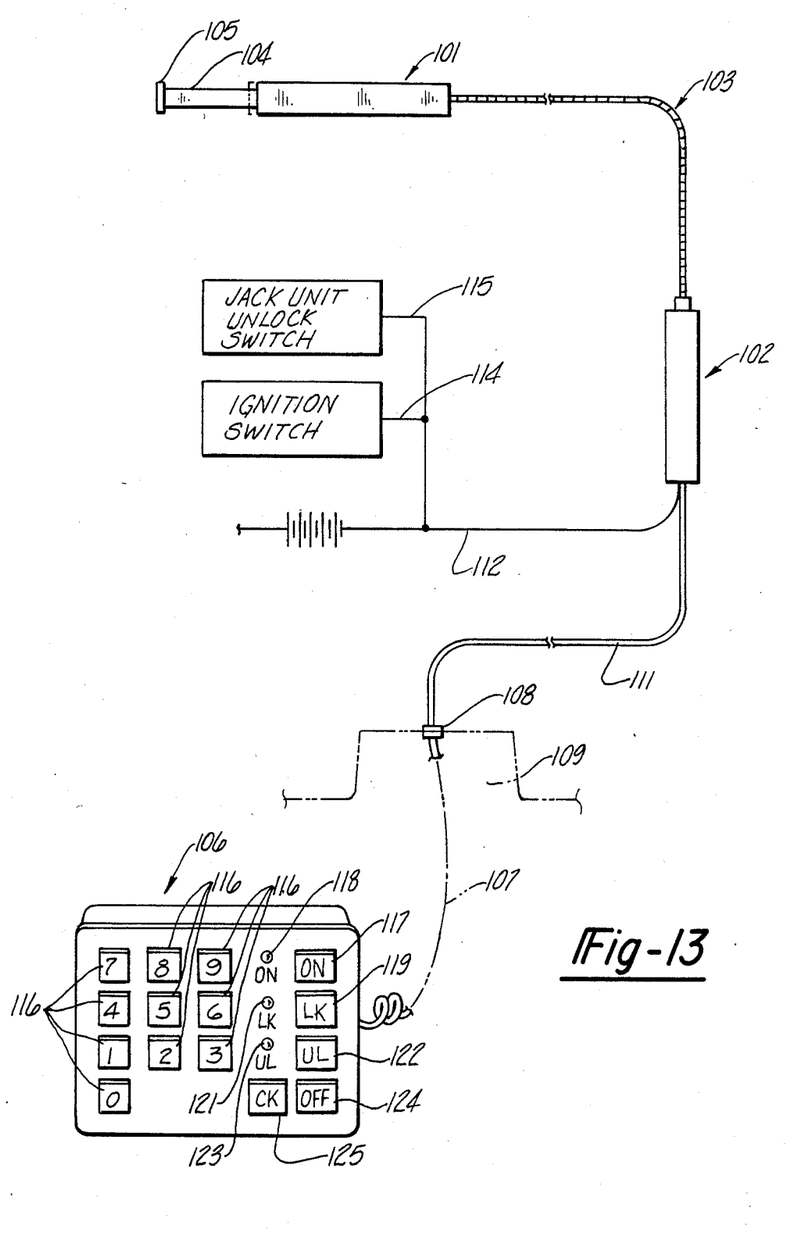
FIG. 13 is a perspective view, in part similar to FIG. 2, showing another embodiment of the invention.

The embodiment thus far described operates primarily on a mechanical principle. That is, the combination lock and structure for operating the locking device were all mechanical. FIG. 13 illustrates an embodiment wherein the components are electrically operated. The general layout of the system is the same and it includes a locking device, indicated generally by the reference numeral 101 that is adapted to cooperate with the Pitman arm or idler arm of the steering mechanism so as to lock it selectively in a fully locked condition. An electric motor and control unit, indicated generally by the reference numeral 102, has its motor output shaft connected by means of a flexible shaft assembly 103 to a screw element of the locking device 101 so as to actuate its blocking member 104 and foot 105 in a manner similar to the previously described embodiment. As in connection with that embodiment, the flexible shaft 103 is provided with a breakaway driving connection to the screw element of the locking device 101 so that if the flexible shaft 103 is severed, the driving connection to the screw of the locking device 101 will be disconnected.

An electrical keyboard, indicated generally by the reference numeral 106 is connected by means of a flexible cable 107 to a connector 108 which may be conveniently positioned anywhere in the vehicle, for example, within the glove box 109. An electrical cable 111 transmits signals from the keyboard 106 to control position of the motor and control unit 102 so as to drive its motor either in a forward or a reverse direction.

An electrical cable, indicated generally by the reference numeral 112, has a connection 113 to the vehicle battery so as to provide a source of power, a connection 114 to the ignition circuit so as to disable it under certain conditions, and a connection 115 to the locking device 101 so as to indicate when it is in a locked or unlocked condition.

The control unit 106 is provided with numbered or lettered keys 116 that provide a combination lock in effect which can provide signals to the main control of the motor unit 102 for effecting its operation will be described. In addition, there is an "on" switch 117 with an adjacent "on" indicator light 118. There is further a lock button 119 with an adjacent lock indicator light 121 and an unlock operator button 122 with an adjacent unlock indicator light 123. There is further an "off" button 124 and a "check" button 125.

This embodiment operates in the following manner. If the operator desires to lock the vehicle, the front wheels are again steered to their fully locked position. At this time, it is necessary for the operator to switch the ignition off so as to energize the electric control 106. This is done as a safety feature so as to prevent locking of the steering when the vehicle is being operated. When the ignition switch is turned off, depressing of the "on" button 117 will energize the locking device and subsequently pushing and holding of the lock button 119 will cause the motor unit 102 to be energized to drive the locking device 101 until the blocking member 104 and its foot 105 engage either the Pitman arm of the idler arm so as to lock the steering in its fully locked condition. After two seconds of operation, the ignition circuit 114 will also be disabled. When the system goes to its locked condition, the conductor 115 will transmit a signal back to illuminate the lock light 121 and indicate that the system is locked. The operator may then disable the device by pressing the "off" button 124.

If the operator desires to reinitiate operation of the vehicle, and while the ignition switch is still switched off, the "on" button 117 is again pushed. The operator must then dial the appropriate combination by pressing the buttons 116 in the proper sequence. If the proper sequence is achieved, the unlock button 122 may be pushed which will then drive the motor 102 in the opposite direction so as to withdraw the blocking member 104 and its foot 105. When the blocking member 104 and foot 105 are fully clear, the conductor 115 will send a signal to the control device 106 to illuminate the unlock button 123. The operator may then switch the device off by pressing the "off" button 124 and the vehicle can be operated in a normal manner.

At any time the operator wishes to determine the status of the locking unit 101, he may push the "check" button 125 and this will illuminate either the lock indicator 121 or the unlock indicator 123 depending upon the condition of the locking unit 101.

It should be readily apparent from the foregoing description that two embodiments of the invention have been described and illustrated, each of which provides a highly effective anti-theft device for a motor vehicle which is operative to lock the steered front wheels in a fully locked condition so as to reduce the likelihood of theft. Furthermore, the device is constructed so as to avoid the likelihood of attack and a breakaway connection is provided with the locking device so that if the connecting device is severed, the driving connection will be automatically disabled.

Although two embodiments of the invention have been illustrated and described, various changes and modifications may be made without departing from the spirit and scope of the invention as defined by the appended claims.

I claim:

1. In an anti-theft device for a motor vehicle having a pair of dirigible front wheels each rotatably journaled on a respective spindle, a steering arm affixed to each spindle, a tie rod pivotally connected at its ends to each of said steering arms for simultaneous steering movement of said spindles, steering means for steering one of said steering arms, and an operator's compartment, a steering wheel and steering shaft located in said operator's compartment and rotatable under operator control, and steering means interconnecting said steering shaft with said one of said steering arms for steering said front wheels, the improvement comprising selectively operable locking means directly engageable with one of said steering arms for preventing steering of said front wheels by said steering shaft and operating means for selectively operating said locking means between a locked and a released position and located within said operator's compartment.

2. In an anti-theft device as set forth in claim 2 wherein the locking means is operative to lock the front wheels in a preselected position.

3. In an anti-theft device as set forth in claim 2 wherein the preselected position is a fully locked steering condition.

4. In an anti-theft device for a motor vehicle having a pair of dirigible front wheels and an operator's compartment, a steering wheel and steering shaft located in said operator's compartment and rotatable under operator control, and steering means interconnecting said steering shaft with said front wheels for steering said front wheels, the improvement comprising selectively operable locking means cooperable with said steering means external of said operator's compartment for preventing steering of said front wheels by said steering shaft, operating means for selectively operating said locking means between a locked and a released position and located within said operator's compartment, connecting means for operating said locking means in response to operation of said operating means, and means for disabling said connecting means upon attack for precluding release of said locking means.

5. In an anti-theft device as set forth in claim 4 wherein the locking means comprises a screw jack and the connecting means comprises a rotary wire contained within a protective sheath for driving said screw jack, the connection between the rotary wire and the jack shaft being disabled upon breaking of the connecting device.

6. In an anti-theft device as set forth in claim 5 further including mechanical control means for rotating rotary wire.

7. In an anti-theft device as set forth in claim 5 including an electric motor for driving the rotary wire.

8. In an anti-theft device as set forth in claim 1 further including means for preventing operation of the locking means upon attack.

* * * * *

UNITED STATES PATENT AND TRADEMARK OFFICE
CERTIFICATE OF CORRECTION

PATENT NO. : 4,683,737
DATED : August 4, 1987
INVENTOR(S) : Ennels Armstrong

It is certified that error appears in the above-identified patent and that said Letters Patent is hereby corrected as shown below:

Column 7, line 21, "of" should be --or--

Column 8, line 23, Claim 2, "2" should be --1--.

Column 8, line 54, Claim 6, after "rotating" insert --the--.

Signed and Sealed this

Fifteenth Day of March, 1988

Attest:

DONALD J. QUIGG

Attesting Officer

Commissioner of Patents and Trademarks